US005907430A

United States Patent [19]
Taylor et al.

[11] Patent Number: 5,907,430
[45] Date of Patent: *May 25, 1999

[54] FILLED PLASTIC MIRRORS AND LOW-COST INFRARED OPTICS SYSTEM

[75] Inventors: Christopher D. Taylor, Redondo Beach, Calif.; Stuart H. Klapper, Plano, Tex.

[73] Assignee: Raytheon Company, El Segundo, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/485,584

[22] Filed: Jun. 7, 1995

Related U.S. Application Data

[63] Continuation-in-part of application No. 08/099,280, Jul. 29, 1993, abandoned.
[51] Int. Cl.[6] .................................................. G02B 5/08
[52] U.S. Cl. .............................................. 359/350; 250/330
[58] Field of Search .................................. 359/350, 359; 156/242, 245, 150, 151; 65/22, 55, 106, 107; 264/45.4; 250/353, 342, 330; 356/326

[56] References Cited

U.S. PATENT DOCUMENTS

| 4,271,360 | 6/1981 | Ward ........................................ 250/353 |
| 4,709,152 | 11/1987 | Muller et al. ........................... 250/342 |
| 5,162,868 | 11/1992 | Ando ....................................... 356/326 |
| 5,178,709 | 1/1993 | Shimodaira et al. .................... 156/242 |

OTHER PUBLICATIONS

Freitag et al, "Human Body Detection with the P/D II Passive Infrared Detector" Mar. 1986, Siemens Components, pp. 92–97 (250/353).

*Primary Examiner*—K. P. Hantis
*Attorney, Agent, or Firm*—Colin M. Raufer; Leonard A. Alkov; Glenn H. Lenzen, Jr.

[57] ABSTRACT

A mirror includes a mirror body with a reflective coating on at least one mirror surface. The mirror body is formed of a plastic into which a filler is mixed. The mirror body is preferably formed by injection molding of a mixture of the plastic and the solid filler. The mirror is used in optical imaging applications such as an infrared optical system.

33 Claims, 3 Drawing Sheets

FILLED PLASTIC MIRRORS AND LOW-COST INFRARED OPTICS SYSTEM

This application is a continuation-in-part of application Ser. No. 08/099,280, filed Jul. 29, 1993, now abandoned, for which priority is claimed.

BACKGROUND OF THE INVENTION

This invention relates to optical systems, and, more particularly, to an infrared optics system using inexpensively produced mirrors of intermediate optical quality.

Passive optical components are widely used in optical systems to direct the path of light beams. Such optical components can be reflective, such as a mirror, or refractive, such as a lens. Light is reflected from the surface of a reflective component, but must pass through the body of a refractive component. When used for infrared applications, refractive components require the use of infrared-transmissive materials, which are expensive by comparison with the materials that can be used for reflective components. This higher cost of refractive components is a particular disadvantage when the optical system is intended to be inexpensive, with intermediate optical performance. The present invention is concerned with low-cost optics systems that are made using mirrors, and the mirrors themselves.

Mirrors are usually made by fabricating a mirror body of a required shape but which is not sufficiently reflective. The fabrication of the mirror body may be straightforward, but can also be quite difficult where a complex mirror structure is required. A reflective coating of aluminum or other material is applied to a surface of the mirror body. Mirror bodies can also be made of a material which itself is highly reflective, and whose surface is polished. Mirrors are available in various grades according to their degree of optical perfection and other properties.

Usually, the higher the quality of the mirror, the greater its cost to produce. The selection of a mirror for a particular optical system is based upon the required optical properties for that system, as well as mechanical, weight, and other requirements. As with other system elements, it is preferred that the mirror not be overdesigned with a level of capability greater than that required by the system. Such higher capability usually is associated with higher cost and may be associated with higher weight and lower strength.

One type of mirror is made of high-quality glass that has been provided with a reflective surface coating. Glass mirrors require polishing. If the shape of the reflective surface is not flat or spherical, the polishing can be difficult and expensive. Glass mirrors are rather fragile and therefore must be specially supported in shock-resistant mounts for many applications, which adds to the cost and weight of the optical system. It can be difficult to fabricate complex mirror structures from glass.

Mirrors have also been made of plastic whose surface has been coated with a reflective coating. The available plastic mirrors have significantly lower optical quality than glass mirrors. On the other hand, they are more resistant to breakage and cost less to produce in mass production quantities. Plastic mirrors are subject to warpage due to bending upon mounting in an optical system because of their lower structural strength. Even though light is reflected from the surface of the mirror, the mirror itself must have good structural strength in order to avoid warpage during service that may completely degrade its optical performance. Temperature effects such as temperature gradients across the mirror can also degrade the performance of a plastic mirror.

Due to their combination of characteristics, the available plastic mirrors simply are not suitable for a number of medium-performance, low-cost potential applications such as in automobiles, security systems, and certain types of sensors such as infrared-detecting sensor systems.

Mirrors can be made of other materials to which a reflective coating may be applied. Metals, such as aluminum or copper, or ceramics can be used in mirrors. Some metals can be used without a surface coating. Metal mirrors can give good optical performance, but they are typically expensive and heavy. Coated ceramic mirrors are expensive to produce and are relatively fragile.

There is a need for an improved mirror having optical performance intermediate that of the available high-performance glass, metal, or ceramic mirrors, and the low-performance plastic mirrors. A mirror of this type would be used in optical systems wherein a moderate degree of optical performance is required. Such a mirror should also be robust, light weight, inexpensive to produce in production quantities, and reasonably stable in service. This need is particularly acute for infrared optical systems, where suitable mirrors have been previously unavailable where such intermediate-level quality is acceptable. The present invention fulfills this need, and further provides related advantages.

SUMMARY OF THE INVENTION

The present invention provides a mirror, a method for its manufacture, and optics systems using the mirror. The mirror has a low production cost and an intermediate level of optical performance that is satisfactory for many consumer and industrial, and some military, applications. The mirror is moderately strong and stable in service, and very light in weight. Complex mirror structures can be readily fabricated using the present approach. The mirrors made according to the invention are particularly suitable for infrared applications.

In accordance with the invention, an optics system comprises a mirror body having one or more mirror surfaces thereon arranged such that radiation reflected from the mirror surfaces follows an intended optical path. The mirror body is made of a mixture of plastic and a filler distributed therein. There is a reflective coating on each mirror surface.

The mirror of the invention are particularly useful in infrared (IR) optical systems operating in the 3–5 and/or 8–12 micrometer ranges. Such an infrared optical system comprises an infrared detector, and a mirror or mirrors positioned to reflect a beam of light toward the infrared detector. The optical system may also contain other optical components, such as lenses, and electrical and mechanical components as well. The mirror comprises a solid mirror body made of a mixture of plastic and a filler, at least one mirror surface on the mirror body, and a reflective coating on the at least one mirror surface. The infrared optical system can also include protective windows and auxiliary lenses, used in conjunction with the mirror.

The body of the mirror of the invention is made of a composite material formed of a filled plastic. As used herein, "filled" means that a second component, sometimes termed a "filler", is distributed through the plastic matrix in a physically distinguishable form. Operable fillers include, for example, glass beads, glass fibers, carbon fibers, and mineral material. The presence of the filler increases the stiffness and thence the stability of the mirror body. The proper selection of the filler can also lead to lower weight, greater strength, greater thermal conductivity, and lower thermal expansion than that of a mirror body made solely of plastic. More than one type of filler can be used, if desired.

It has been known previously to make mirror bodies of plastic. Filled plastics have also been known for reflectors used with light in the visible range. To the knowledge of the inventors, the surprising and unexpected advantages of using a filled plastic for a mirror body for applications where infrared imaging is required have not previously been recognized. This use of filled plastic mirrors for infrared imaging applications is particularly desirable, because surface smoothness is less critical than for visible-light imaging applications. Consequently, some filler materials can be used in filled-plastic mirrors for infrared imaging applications which could not be used for visible-light imaging applications. Nor has it been known to use filled plastic for complex, multi-mirror integral optical systems.

The present invention therefore provides an advance in the art of mirror and optical system technology. Mirrors of moderate optical performance can be prepared inexpensively. The mirrors are reasonably strong and stable, and are therefore suitable for use in many optical systems. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
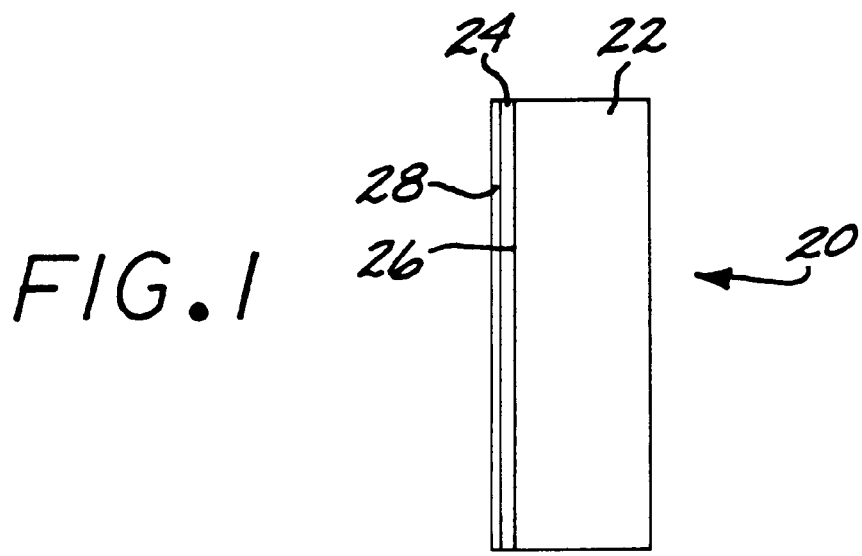
FIG. 1 is a side elevational view of a mirror made according to the present invention.

FIG. 1 illustrates a mirror 20 made according to the present invention. The mirror 20 includes a solid mirror body 22 made of a mixture of a plastic and a filler. A reflective coating 24 is present on at least one surface 26 of the mirror body 22. An overcoating 28 such as a protective coating is optionally present overlying the coating 24.

Figure 2:
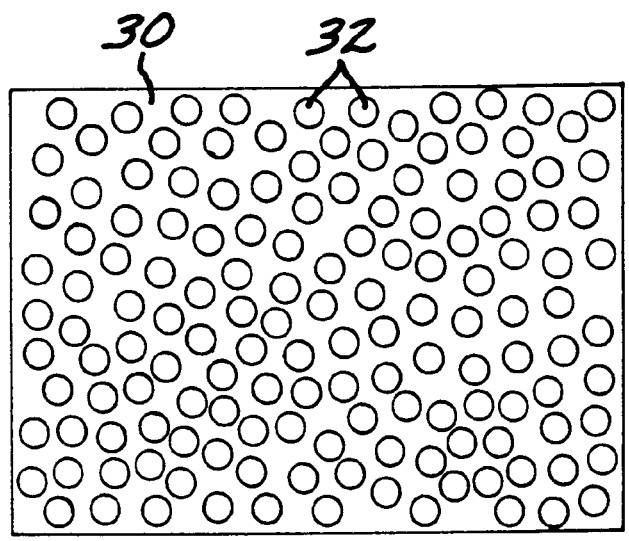
FIG. 2 is an enlarged idealized representation of the internal structure of the mirror body of FIG. 1.

FIG. 2 is a drawing of a suitable microstructure of the mirror body 22. The mirror body 22 is formed of a composite of a continuous plastic matrix 30 in which particles 32 of a filler are embedded.

The particulate filler material adds stiffness and strength to the mirror body. The mirror body is therefore stronger, and can be made thinner and lighter in weight, than a mirror body made only of plastic material. Typical filler materials, to be discussed in more detail subsequently, also reduce the coefficient of thermal expansion of the mirror body, thereby reducing its susceptibility to thermal strains resulting from temperature changes experienced by the mirror during service. The greater stiffness and lower thermal strains result in a mirror body and mirror that are more stable during service. Consequently, the optical performance is improved.

Figure 3:
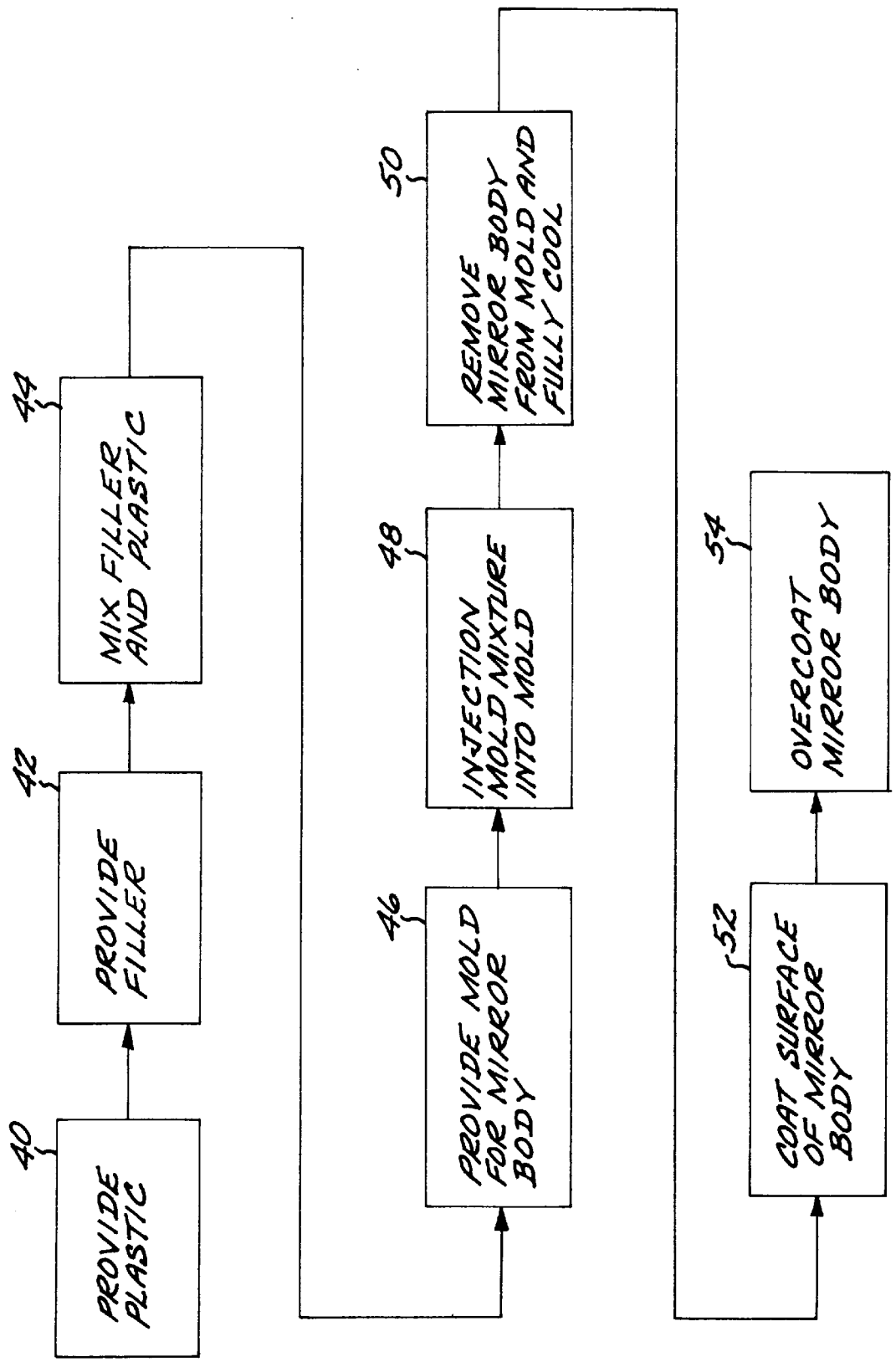
FIG. 3 is a block flow diagram of a method for producing a mirror.

FIG. 3 illustrates a preferred injection molding method for preparing the mirror of the invention. The plastic material is provided, numeral 40. The plastic may be any thermoformable plastic that is suitable for injection molding. Examples of such plastics include polycarbonate, polyetherimide, polyphenylene sulfide, polyether sulfone, and polyetherketone, as well as many others. The plastic need not have good optical transmission properties, inasmuch as it is here used to form a mirror body.

The filler material is provided, numeral 42. The filler material is in the form of generally equiaxed particulate or fibers. The filler material should not be too coarse, as a coarse particulate could cause irregularities in the surface of the mirror body and thence the mirror. The filler particulate should be of a diameter (if particulate) or cylindrical diameter (if a fiber) of no greater than about 0.005 inch. The particulate is preferably roughly equiaxed, but may be slightly elongated. The particulate may be solid throughout or it may be hollow, such as hollow microspheres. A hollow particulate has the advantage that it reduces the density and weight of the mirror.

The filler material may be any operable material that can be mixed with the plastic and injection molded. The filler material need not have good optical transmission properties. Examples of operable filler materials include glass beads, glass fibers, carbon fibers, minerals such as asbestos, mica, and silica, and refractories.

A particularly preferred combination of plastic and filler material is polyphenylene sulfide plastic and glass or mineral filler particles. Such a material is readily injection molded, is strong, and has good stiffness. It is resistant to warpage due to temperature changes, and is resistant to corrosive or other chemical attack. This material is available commercially from Mobay Corporation, Pittsburgh, Pa. as Tedur KU1-9560 (60 volume percent filler) or Tedur KU1-9561 (55 volume percent filler). While this material has been known for use in simple reflective surfaces for visible-light applications such as automobile head lamps, it has not, to the inventors' knowledge, been used for more complex multi-mirror optics systems, such as those for infrared imaging applications wherein the filler may be relatively coarse without adversely affecting mirror reflectance properties.

The filler material and the plastic are mixed together, numeral 44. The amount of filler material is desirably from about 10 to about 70 percent of the total volume of the plastic and the filler material, after molding. If the filler material is present in an amount of less than about 10 percent of the total volume, insufficient strengthening results. If the filler material is present in an amount of more than about 70 percent of the total volume, the strength of the resulting structure is typically too low and the surface reflection properties of the mirror are degraded. In most instances a single filler material is used, but in other cases more than one filler material can be incorporated into the plastic/filler composite.

In a most preferred embodiment, the plastic is polyphenylene sulfide and the filler material is glass particles of a size of about 0.002 inches. The particles are present in an amount of about 40 percent of the total volume of plastic and filler material.

An injection molding mold for the mirror body is provided, numeral 46. The interior shape of the mold depends upon the required mirror body and therefore cannot be described in greater detail in any general sense. The mold is used in injection molding, and the design of molds for such a process is well known in the art. It may be noted, however, that the selection of injection molding for fabricating the mirror body permits a wide range of simple and intricate designs to be used. One-piece and multipiece mirror structures may be fabricated using this approach.

Whatever the shape of the mirror body and the mold, that portion of the mold which defines the reflective surface of the mirror body is preferably polished to a surface smoothness of no more than about 20 Angstroms RMS roughness. The surface smoothness of the reflective surface of the mirror body is typically 10–50 microinches RMS for mirrors used to reflect visible light and 100–500 microinches RMS for mirrors used to reflect infrared radiation. The mirrors used for infrared applications therefore permit the use of coarser filler than the mirrors used for visible-light applications.

The mixture of plastic and filler material is injection molded into the mold, numeral 48. Injection molding as a technique and the apparatus for injection molding are both well known. Briefly, the plastic is melted with the filler material remaining solid. The plastic and filler material mix together so that there is a degree of wetting of the molten plastic to the filler material. The mixture is forced into the mold and cooled so that the molten plastic solidifies. The mold is typically externally or internally cooled to accelerate the cooling of the mixture. At no time during this process is the filler material melted in the preferred approach, so that the filler material and the plastic remain as distinctly separate but bonded phases, as shown in FIG. 2.

The mirror body 22 is removed from the mold and allowed to fully cool, numeral 50. Sophisticated injection molding machines accomplish the heating, injection molding, cooling, and removal (also termed ejection) in an automated, rapid fashion. Mirror bodies can therefore be fabricated rapidly and inexpensively.

At least one surface 26 of the mirror body 22 is coated by any operable process with the reflective coating 24, numeral 52. The coating is preferably aluminum, but may also be other reflective materials such as gold, copper, palladium, rhodium, or silver. Operable processes for applying the coating include, for example, vacuum deposition, sputtering, replication, plasma vacuum deposition, and electroless deposition. The coating process is continued until the coating 24 has reached a sufficient thickness. A thickness of the coating 24 of about 1000 Angstroms to about 25,000 Angstroms is preferred.

The overcoating 28 is optionally applied over the coating 24, numeral 54. The overcoating 28 is one or more layers of a protective material such as silica ($SiO_2$) or a reflectivity enhancing material which, by virtue of the selection of proper optical index, achieves improved reflectivity. The overcoating typically has a thickness of about one-quarter of the wavelength of the radiation with which the mirror is to be used. The use of such materials and their selection is well known in the art for other applications.

Figure 4:
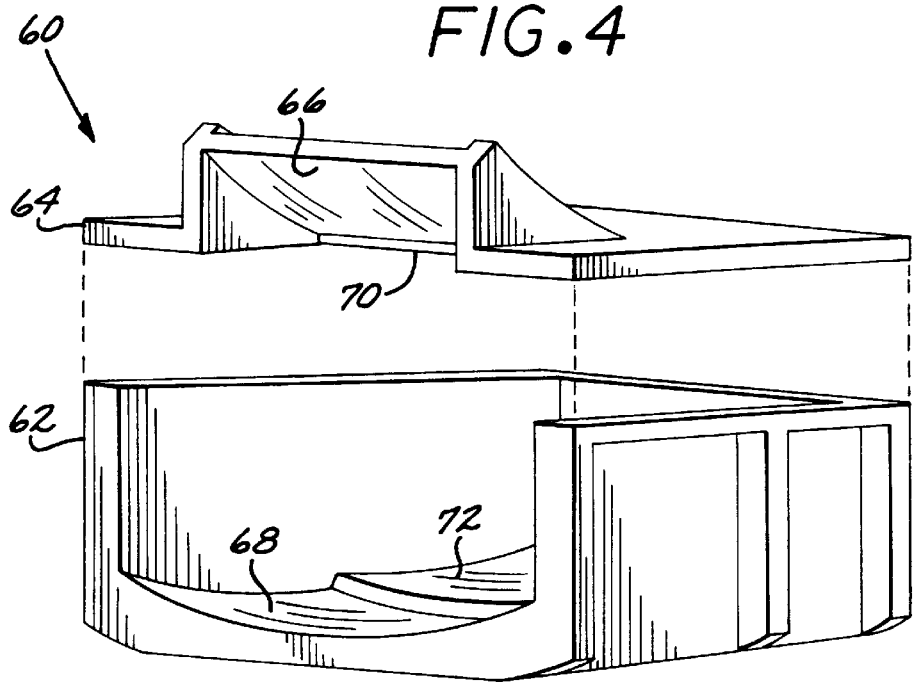
FIG. 4 is a exploded perspective view of an optics system, illustrating its mode of assembly.

FIG. 4 depicts an example of an optics system 60 that can be readily fabricated by the present approach. A four-mirror optics system 60 is prepared as a bottom piece 62 and separate top piece 64, and thereafter joined. The bodies of the pieces 62 and 64 are fabricated by the injection molding process just described and coated on the appropriate reflective surfaces. The pieces 62 and 64 are then assembled as shown. Mounting hardware, attachment hardware, and other required features of the mirror 60 are readily molded integrally into the mirror structure, further reducing its production cost and weight.

Figure 5:
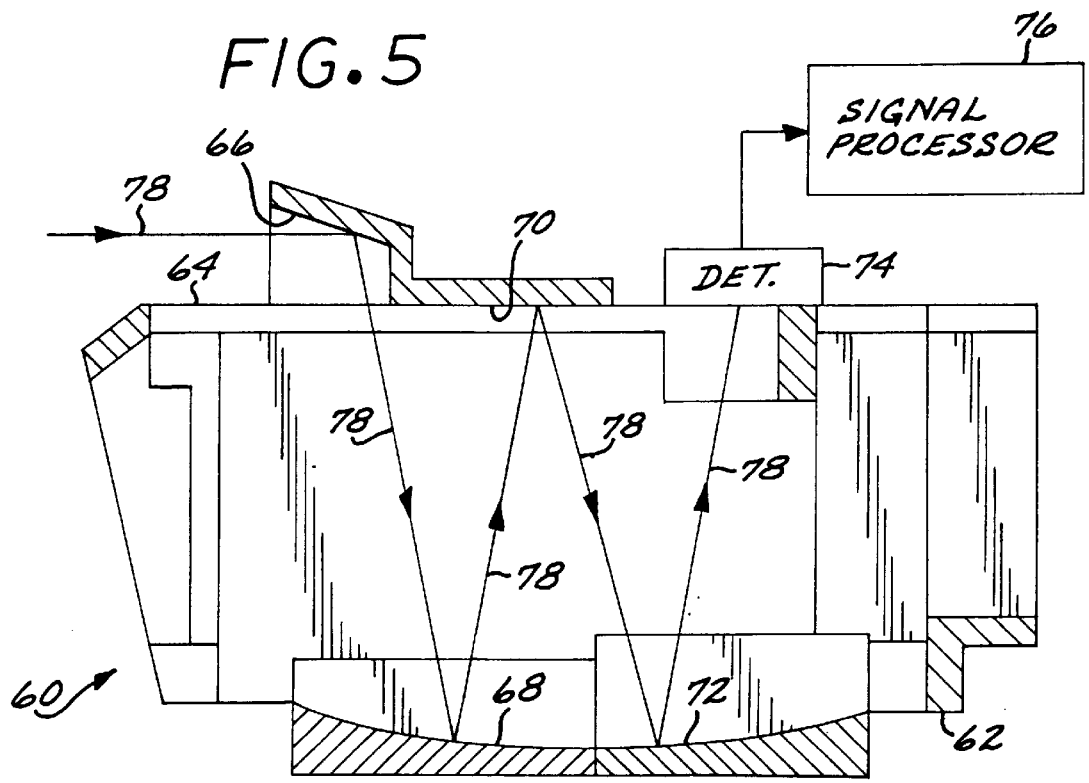
FIG. 5 is a sectional view of the optics system of FIG. 4.

FIG. 5 shows the interior of the optics system 60. Four mirror surfaces 66, 68, 70, and 72 are defined in the injection molding operation and thereafter coated. A focal plane infrared detector 74 is affixed to the optics system 60 at an opening molded into the top piece 64. The output of the infrared detector 74 is provided to a signal processor 76. The detector 74 and signal processor 76 are well known in the art. A ray path 78 is shown in FIG. 5 to illustrate the path of infrared radiation that enters the optics system 60, reflects from the mirrors 66, 68, 70, and 72 in order, and finally is directed to the infrared detector 74. The mirrors are shaped and oriented to direct the infrared radiation to the infrared detector with a desired degree of focus and size. An infrared-transmissive window (not shown) can be placed over the opening (FIG. 4) of the optics system 60 to protect it from dirt and corrosives.

Prototype mirrors have been fabricated according to the present approach and comparatively tested against prior mirrors made of plastic and not containing a filler. The resistance to bending of a mineral-filled polyphenylene sulfide material (with 40 percent by volume mineral) is three times that of unfilled polyetherimide material. The optical properties in conditions of thermal gradients were also significantly improved by the use of the filler. Mirror warpage on the order of 150 fringes of visible light (corresponding to about 0.002 inches of warpage) was found in an unfilled polycarbonate mirror with a 5–10° C. gradient across the mirror. The corresponding filled polycarbonate with 20 percent by volume glass beads exhibited less than 10 fringes of warpage in the same testing.

Other features and advantages of the present invention will be apparent from the following more detailed description of the preferred embodiment, taken in conjunction with the accompanying drawings, which illustrate, by way of example, the principles of the invention.

What is claimed is:

1. An optics system, comprising:
    a mirror body having at least two mirror surfaces thereon arranged such that the mirror surfaces define an optical path extending between the at least two mirror surfaces, the mirror body being made of a mixture of plastic and a filler distributed therein, wherein the filler is generally equiaxed; and
    a reflective coating on each mirror surface.

2. The optics system of claim 1, wherein the plastic is selected from the group consisting of polycarbonate, polyetherimide, polyphenylene sulfide, polyether sulfone, and polyetherketone.

3. The optics system of claim 1, wherein the filler is selected from the group consisting of glass beads, glass fibers, carbon fibers, a mineral, and a refractory.

4. The optics system of claim 1, wherein the filler comprises from about 10 to about 70 volume percent of the total of plastic and filler.

5. The optics system of claim 1, wherein the plastic is polyphenylene sulfide and the filler is present in an amount of from about 40 to about 60 percent by volume of the total of plastic and filler.

6. The optics system of claim 1, wherein the reflective coating is selected from the group consisting of aluminum, gold, copper, palladium, rhodium, and silver.

7. The optics system of claim 1, wherein the reflective coating is from about 1000 Angstroms to about 25,000 Angstroms thick.

8. The optics system of claim 1, further including an overcoating overlying the reflective coating on each mirror surface.

9. The optics system of claim 1, wherein the mirror body has a coefficient of thermal expansion of from about $0.5 \times 10^{-5}$ inches/inch° F. to about $2.0 \times 10^{-5}$ inches/inch° F.

10. The optics system of claim 1, wherein the mirror body has a flexural modulus of from about $1.0 \times 10^6$ pounds/square inch to about $2.5 \times 10^6$ pounds/square inch.

11. The optics system of claim 1, further including an infrared detector disposed to lie in the optical path.

12. The optics system of claim 11, wherein the infrared detector is affixed to the mirror body at an opening molded into the mirror body.

13. The optics system of claim 1, wherein the filler has a diameter of no greater than about 0.005 inches.

14. The optics system of claim 11, wherein the infrared detector is a focal plane infrared detector.

15. The optics system of claim 1, wherein the plastic is a thermoformable plastic.

16. An infrared optics system for use with infrared radiation, comprising:

an infrared detector; and a mirror positioned to reflect a beam of infrared radiation toward the infrared detector, the mirror comprising:
a solid mirror body made of a mixture of plastic and a filler, the plastic being a thermoformable plastic,
at least two mirror surfaces on the mirror body, the at least two mirror surfaces being arranged to define an optical path extending between the at least two mirror surfaces and the infrared detector, and
a reflective coating on each of the mirror surfaces.

17. The infrared optics system of claim 16, wherein the infrared detector is affixed to the mirror body at an opening molded into the mirror body.

18. The infrared optics system of claim 16, wherein the infrared optics system has no refractive elements therein.

19. The infrared optics system of claim 16, wherein the mirror body has at least two mirror surfaces thereon and the at least two mirror surfaces are coated with the reflective coating, the two mirror surfaces being arranged to direct a beam of infrared radiation toward the infrared detector.

20. The infrared optics system of claim 16, wherein the plastic is polyphenylene sulfide.

21. The infrared optics system of claim 16, wherein the filler has a diameter of no greater than about 0.005 inches.

22. The infrared optics system of claim 16, wherein the infrared detector is a focal plane infrared detector.

23. The infrared optics system of claim 16, wherein the filler is generally equiaxed.

24. A method for detecting infrared radiation, comprising the steps of:

providing an infrared detector;

providing a mirror, the mirror comprising:
a solid mirror body made of a mixture of a thermoformable plastic and a filler, the step of providing including the step of injection molding the mixture of thermoformable plastic and filler into a shape of the mirror body, and
a reflective coating on at least one surface of the mirror body, the mirror being positioned to reflect a beam of infrared radiation from the reflective coating toward the infrared detector; and directing a beam of infrared radiation against the reflective coating of the mirror, whereupon the beam is reflected into the infrared detector.

25. The method of claim 24, wherein the step of providing a mirror includes the step of:

providing a mirror body having at least two mirror surfaces thereon arranged such that the mirror surfaces define an optical path extending between the at least two mirror surfaces and to the detector, and a reflective coating on each mirror surface.

26. The method of claim 24, wherein the step of providing a mirror includes the step of:

providing a thermoformable plastic selected from the group consisting of polycarbonate, polyetherimide, polyphenylene sulfide, polyether sulfone, and polyetherketone.

27. The method of claim 24, wherein the step of providing a mirror includes the step of:

providing a filler selected from the group consisting of glass beads, glass fibers, carbon fibers, a mineral, and a refractory.

28. The method of claim 24, wherein the step of providing a mirror includes the step of:

providing the filler in an amount of from about 10 to about 70 volume percent of the total of thermoformable plastic and filler.

29. The method of claim 24, wherein the step of providing a mirror includes the step of:

providing polyphenylene sulfide as the plastic, and providing the filler in an amount of from about 10 to about 70 percent by volume of the total of plastic and filler.

30. The method of claim 24, wherein the step of providing a mirror includes the step of:

providing a mirror body having a coefficient of thermal expansion of from about $0.5 \times 10^{-5}$ inches/inch° F. to about $2.0 \times 10^{-5}$ inches/inch° F.

31. The method of claim 24, wherein the step of providing a mirror includes the step of:

providing a mirror body having a flexural modulus of from about $1.0 \times 10^6$ pounds/square inch to about $2.5 \times 10^6$ pounds/square inch.

32. The method of claim 24, including an additional step of affixing the infrared detector to the mirror body at an opening molded into the mirror body.

33. The method of claim 24, wherein the filler is generally equiaxed.

* * * * *